(12) United States Patent  
Katou

(10) Patent No.: US 7,187,272 B2
(45) Date of Patent: Mar. 6, 2007

(54) CASING STRUCTURE OF TRANSMITTER OF TIRE CONDITION MONITORING APPARATUS

(75) Inventor: Michiya Katou, Ichinomiya (JP)

(73) Assignee: Pacific Industrial Co., Ltd., Gifu-ken (JP)

( * ) Notice: Subject to any disclaimer, the term of this patent is extended or adjusted under 35 U.S.C. 154(b) by 210 days.

(21) Appl. No.: 10/926,616

(22) Filed: Aug. 26, 2004

(65) Prior Publication Data

US 2005/0046557 A1 Mar. 3, 2005

(30) Foreign Application Priority Data

Aug. 27, 2003 (JP) .............................. 2003-303501

(51) Int. Cl.
*B60C 23/00* (2006.01)
(52) U.S. Cl. ................... 340/442; 340/445; 340/447; 340/449; 340/426.26; 340/426.33; 73/146.2; 73/146.8
(58) Field of Classification Search ................ 340/442, 340/445, 447, 449, 426.33, 539.26, 539.22; 73/146, 146.8, 146.2, 146.5
See application file for complete search history.

(56) References Cited

U.S. PATENT DOCUMENTS 5,844,131 A * 12/1998 Gabelmann et al. ....... 73/146.8
6,055,855 A * 5/2000 Straub ....................... 73/146.8
6,591,672 B2  7/2003 Chuang et al.
2002/0029627 A1  3/2002 Delaporte et al.
2003/0126919 A1  7/2003 Hsu

FOREIGN PATENT DOCUMENTS

JP       2001-174357       6/2001

* cited by examiner

*Primary Examiner*—Tai Nguyen
(74) *Attorney, Agent, or Firm*—Patterson, Thuente, Skaar & Christensen, P.A.

(57) ABSTRACT

A transmitter in an apparatus for monitoring a condition of a tire attached to a wheel of a vehicle is fixed to the wheel such that the transmitter faces an outer circumferential surface of a wheel rim. The transmitter includes a circuit portion that detects the condition of the tire. The transmitter includes a casing that accommodates the circuit portion, and a leg that extends from the casing toward the outer circumferential surface of the wheel rim. The extended amount of the leg is adjustable such that the leg contacts the outer circumferential surface of the wheel rim when the transmitter is fixed to the wheel. Therefore, the transmitter is mounted to the wheel such that legs of the casing abut against the wheel rim regardless of the size of the wheel.

5 Claims, 5 Drawing Sheets

CASING STRUCTURE OF TRANSMITTER OF TIRE CONDITION MONITORING APPARATUS

BACKGROUND OF THE INVENTION

The present invention relates to casing structure of a transmitter of a tire condition monitoring apparatus. More particularly, the present invention pertains to casing structure of a transmitter for a wireless tire condition monitoring apparatus that permits a driver in a vehicle passenger compartment to check conditions of tires, such as the air pressure.

Wireless tire condition monitoring apparatuses that allow a driver in a vehicle passenger compartment to check the conditions of vehicle tires have been proposed. The apparatus includes transmitters and a receiver. Each transmitter is located in the wheel of one of the tires and the receiver is located in the body frame of the vehicle. Each transmitter detects the tire conditions, such as air pressure and the temperature of the associated tire, and wirelessly transmits the detected information. The receiver receives data wirelessly transmitted by the transmitters with a reception antenna and displays the conditions of the tires, for example, on a display located in front of the driver's seat. Each transmitter is formed by electronic elements such as a pressure sensor and a transmission antenna, which are mounted on a substrate. The substrate on which the electronic elements are mounted is accommodated in a casing. The casing includes a valve stem through which air flows when inflating the associated tire. Each valve stem is mounted to a mounting hole of the associated wheel with a valve nut. At this time, the casing is in contact with a rim (drop center) of the wheel (Japanese Laid-Open Patent Publication No. 2001-174357).

However, the size of the wheels varies depending on the type of the vehicle. For example, 12–15 inch wheels are mainly mounted on light cars. On passenger cars, 14–18 inch wheels are mainly mounted. On busses and trucks, 17.5 inch, 19.5 inch, and 22.5 inch wheels are mainly mounted. Therefore, the curvature of wheels differs depending on the size of the wheels. Thus, legs of the casing need to have the length corresponding to the curvature of the wheel to mount the casing to the wheel such that the legs of the casing abut against the wheel rim. Furthermore, if the casing is mounted to the wheel such that the legs of the casing abut against the wheel rim, the casing is prevented from rotating with the rotation of the valve nut when mounting the valve stem to the mounting hole of the wheel with the valve nut. However, manufacturing the casing such that the legs of the casing correspond to the size of the wheel is inefficient.

SUMMARY OF THE INVENTION

Accordingly, it is an objective of the present invention to provide a casing structure of a transmitter of a tire condition monitoring apparatus that permits the transmitter to be mounted to a wheel such that legs of the casing, which accommodates the circuit portion, abut against a wheel rim regardless of the size of the wheel.

To achieve the above-mentioned objective, the present invention provides a transmitter in an apparatus for monitoring a condition of a tire attached to a wheel of a vehicle. The transmitter is fixed to the wheel such that the transmitter faces an outer circumferential surface of a wheel rim. The transmitter includes a circuit portion that detects the condition of the tire and generates a transmission signal that contains data representing the detected condition of the tire. The transmitter includes a casing that accommodates the circuit portion, and a leg that extends from the casing toward the outer circumferential surface of the wheel rim. The extended amount of the leg is adjustable such that the leg contacts the outer circumferential surface of the wheel rim when the transmitter is fixed to the wheel.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A tire condition monitoring apparatus according to one embodiment of the present invention will now be described with reference to the drawings. The apparatus is used in a vehicle such as an automobile.

Figure 1:
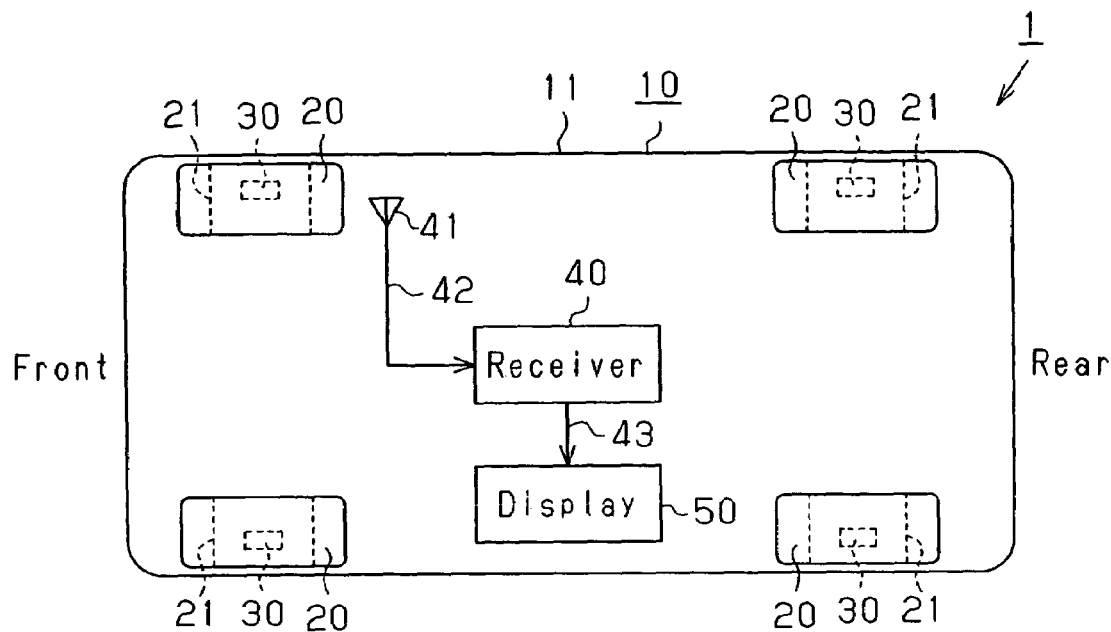
FIG. 1 is a block diagram showing a tire condition monitoring apparatus according to the present invention.
Figure 2:
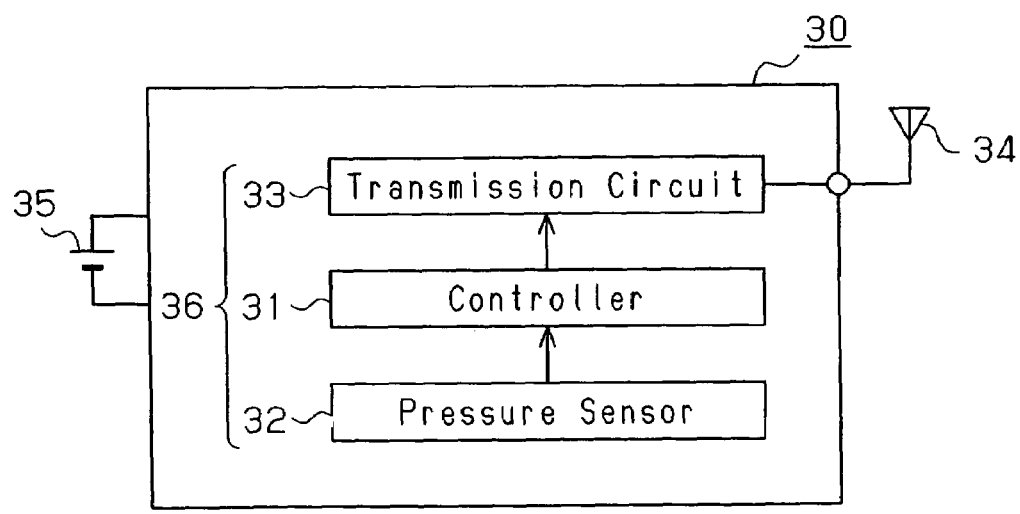
FIG. 2 is a block diagram showing a transmitter incorporated in the apparatus shown in FIG. 1.

As shown in FIG. 1, the tire condition monitoring apparatus 1 includes four transmitters 30 and a single receiver 40. Each of the transmitters 30 is associated with a different one of four tires 20 of a vehicle 10. The receiver 40 is installed in a body frame 11 of the vehicle 10.

Figure 6:
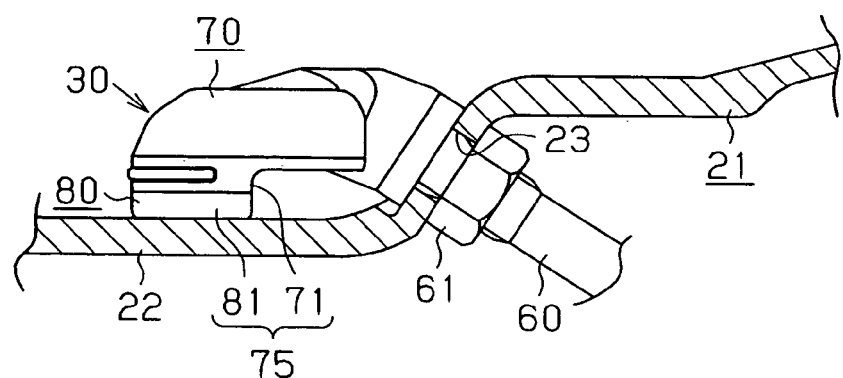
FIG. 6 is a side view illustrating a state where the casing shown in FIG. 3(a) is attached to the wheel rim.

Each transmitter 30 is fixed to a wheel 21 such that the transmitter 30 is located in the associated tire 20. Specifically, as shown in FIG. 6, the transmitter 30 is fixed to the wheel 21 to face the outer circumferential surface of the rim 22 of the wheel 21. Each transmitter 30 measures the condition of the corresponding tire 20, that is, the pressure of the tire 20. The transmitter 30 then wirelessly transmits data containing air pressure data.

As shown in FIG. 1, the receiver 40 is located at a predetermined position on the body frame 11 and is activated by electricity of a battery (not shown) of the vehicle 10. The receiver 40 is connected to a reception antenna 41 with a cable 42. The receiver 40 receives data transmitted by the transmitters 30 through the reception antenna 41.

A display 50 is located in the view of the driver of the vehicle 10, for example, in the passenger compartment. The display 50 is connected to the receiver 40 with a cable 43.

Each transmitter 30 includes a circuit portion 36 that detects the condition of the corresponding tire 20 and generates a transmission signal that contains data representing the detected condition of the tire 20. The circuit portion 36 includes a controller 31, a pressure sensor 32, and a transmission circuit 33.

The transmitter 30 is a microcomputer. The controller 31 includes, for example, a central processing unit (CPU), a read only memory (ROM), and a random access memory (RAM). A unique ID code is registered in an internal memory, for example, the ROM, of the controller 31. The ID code is used to distinguish the associated transmitter 30 from the other three transmitters 30.

The tire pressure sensor 32 measures the air pressure in the interior of the associated tire 20 and provides the controller 31 with pressure data, which is obtained from the measurement. The controller 31 supplies a transmission circuit 33 with data including a signal indicating the received air pressure data and the specific ID code registered in the internal memory. The transmission circuit 33 encodes and modulates the data sent from the controller 31. The transmission circuit 33 then wirelessly transmits the data through a transmission antenna 34. Each transmitter 30 is provided with a battery 35. The transmitter 30 is driven by electricity of the battery 35.

Figure 3A:
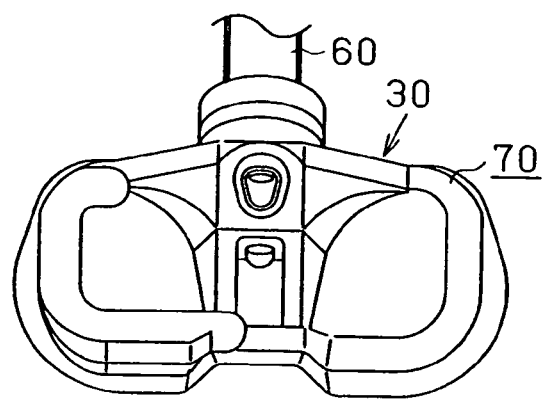
FIG. 3(a) is a plan view illustrating a casing, which accommodates the circuit portion shown in FIG. 2.
Figure 3B:
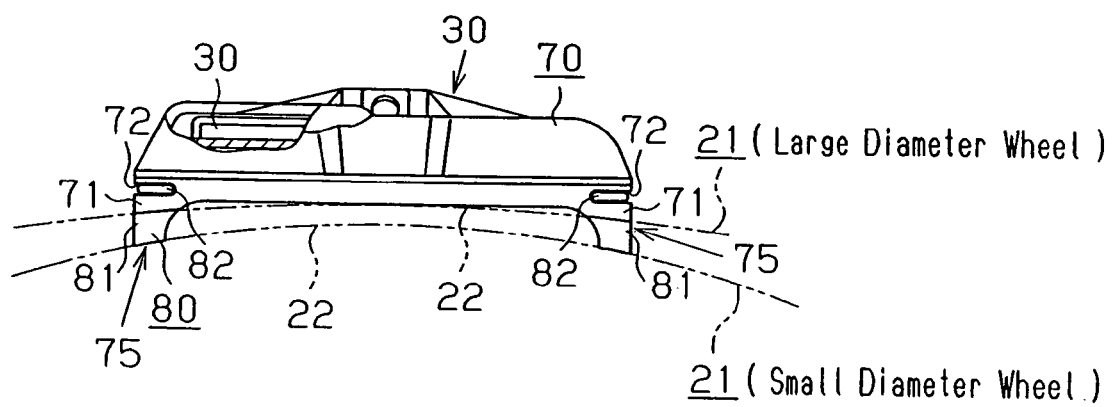
FIG. 3(b) is a front view illustrating the casing shown in FIG. 3(a)

As shown in FIGS. 3(a) and 3(b), each circuit portion 36 is accommodated in a casing 70 that is located below a valve stem 60. A pair of first extended portions 71 are located below the casing 70. Each first extended portion 71 has an engaging hole 72, which functions as an engaging opening.

Figure 4A:
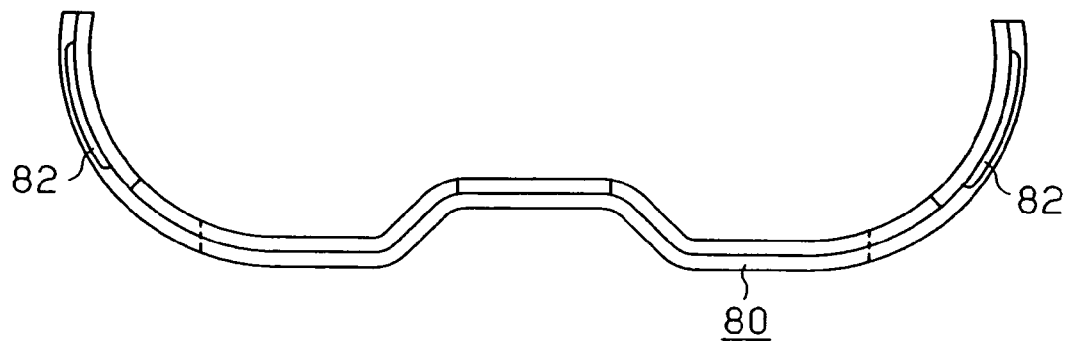
FIG. 4(a) is a plan view illustrating the attachment shown in FIG. 3(b)
Figure 4B:
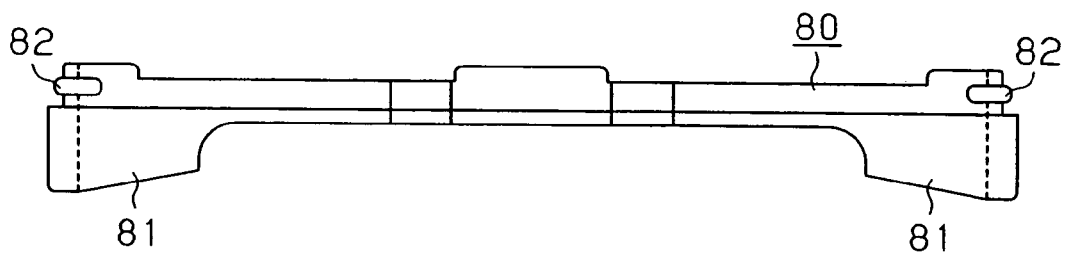
FIG. 4(b) is a front view illustrating the attachment shown in FIG. 4(a)
Figure 4C:
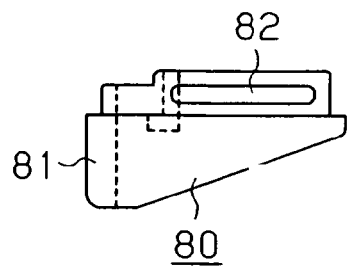
FIG. 4(c) is a side view illustrating the attachment shown in FIG. 4(b)

As shown in FIGS. 4(a) to 4(c), an attachment 80 is formed of elastic member such as synthetic resin and is formed to be substantially arcuate. A second extended portion 81 is formed below each end of the attachment 80. An engaging hook 82 is formed above each end of the attachment 80 to be engaged with the corresponding engaging hole 72 of the casing 70. The engaging hooks 82 and the engaging holes 72 form an engaging mechanism for engaging the attachment 80 with the casing 70. The engaging mechanism is located between the casing 70 and the attachment 80.

Figure 5:
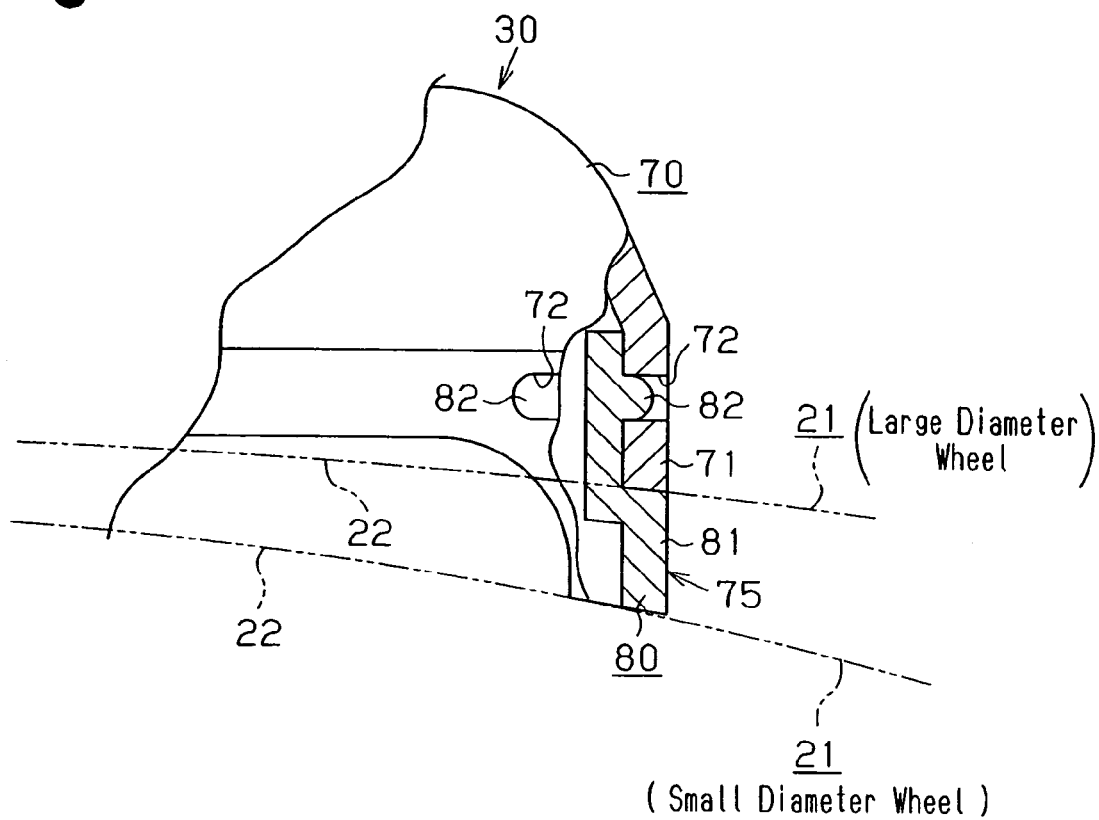
FIG. 5 is a cross-sectional view illustrating the engagement state between the casing and the attachment shown in FIG. 3(b)

As shown in FIGS. 3(b) and 5, the attachment 80 is detachably attached to the casing 70. The attachment 80 is deformed by a hand and the engaging hooks 82 are abut against the engaging holes 72 of the casing 70. When the hand is removed from the attachment 80, the engaging hooks 82 engage with the engaging holes 72 by the elastic return force of the attachment 80. That is, the engaging mechanism permits the attachment 80 to be engaged with and detached from the casing 70 by means of elastic deformation of the attachment 80. As a result, the first extended portions 71 of the casing 70 are prolonged by the second extended portions 81 of the attachment 80. Each first extended portion 71 and the corresponding second extended portion 81 form a leg 75. As shown in FIG. 6, each leg 75 extends from the casing 70 toward the outer circumferential surface of the wheel rim 22. The length of the second extended portions 81 is determined in accordance with the curvature of the wheel 21. That is, the length of the second extended portions 81 is formed such that the second extended portions 81 contact the wheel rim 22. In other words, the second extended portions 81 are formed in accordance with the size of the wheel 21. The extended amount of each leg 75 can be adjusted by selectively attaching the attachment 80. In other words, the attachment 80 is selected from a plurality of attachments 80 that are prepared in advance according to variations in the size and the shape of the wheel 21. Thus, each transmitter 30 can be mounted to the associated wheel 21 such that the first extended portions 71 of the casing 70 or the second extended portions 81 abut against the wheel rim 22 by selectively attaching the attachment 80 that corresponds to the size of the wheel 21. That is, when the transmitter 30 is fixed to the wheel 21, the legs 75 contact the outer circumferential surface of the wheel rim 22. The legs 75 contact the outer circumferential surface of the wheel rim 22 at sections that face the ends of the casing 70 with respect to the circumferential direction of the wheel 21.

More specifically, during wintertime, when attaching the tire 20 for winter use such as a 15 inch studless tire to the wheel 21, the attachment 80 is engaged with the casing 70. On the other hand, when attaching the normal tire 20 to the 17 inch wheel 21 during times other than wintertime, the attachment 80 is removed from the casing 70. As described above, even when the size of the wheels 21 attached to the vehicle 10 varies, each transmitter 30 can be attached to the associated wheel 21 such that the first extended portions 71 of the casing 70 or the second extended portions 81, contact the wheel rim 22 by selectively attaching the attachment 80 corresponding to the size of the wheel 21 to the casing 70.

As shown in FIG. 6, when mounting the casing 70 to which the attachment 80 is attached to the mounting hole 23 of the wheel 21, the valve stem 60 is firstly inserted through the mounting hole 23 of the wheel 21. When a valve nut 61 is fastened to the valve stem 60, the casing 70 to which the attachment 80 is attached is mounted to the mounting hole 23 of the wheel 21. At this time, the second extended portions 81 of the attachment 80 abut against the wheel rim 22. Therefore, even when the valve nut 61 is fastened to the valve stem 60, the casing 70 does not rotate with the valve nut 61. Accordingly, the casing 70 is easily mounted to the wheel 21.

This embodiment provides the following advantages.

(1) The attachment 80 is deformed by hand and the engaging hooks 82 are abut against the engaging holes 72 of the casing 70. When the hand is removed from the attachment 80, the engaging hooks 82 engage with the engaging holes 72 by the elastic return force of the attachment. As a result, the first extended portions 71 of the casing 70 are prolonged by the second extended portions 81 of the attachment 80. The length of the second extended portions 81 is formed such that the second extended portions 81 contact the wheel rim 22. In other words, the second extended portions 81 are formed in accordance with the size of the wheel 21. Thus, each transmitter 30 can be mounted to the associated wheel 21 such that the first extended portions 71 of the casing 70, which accommodates the circuit portion 36, or the second extended portions 81 abut against the wheel rim 22 of the wheel 21 by selectively attaching the attachment 80 that corresponds to the size of the wheel 21. That is, the extended amount of the legs 75 is adjustable such that the legs 75 contact the outer circumferential surface of the wheel rim 22 when the transmitter 30 is fixed to the wheel 21.

(2) The attachment 80 is designed such that the engaging hooks 82 are engaged with the engaging holes 72 by deforming the attachment 80 by hand. Therefore, tools for engaging the attachment 80 to the casing 70 are unnecessary. Therefore, the attachment 80 is selectively attached to and detached from the casing 70 easily.

(3) Furthermore, the engaging hooks 82 are engaged with the engaging holes 72 by the elastic return force of the attachment 80. Thus, the attachment 80 will not be detached from the casing 70 easily even if the associated tire 20 vibrates as the vehicle 10 travels. Therefore, even if the vehicle 10 is traveling on a rough road, the first extended portions 71 of the casing 70, which accommodates the circuit portion 36, or the second extended portions 81, are maintained in contact with the wheel rim 22.

(4) In addition, the casing 70 is attached with the first extended portions 71 of the casing 70 or the second extended portions 81 being abutted against the wheel rim 22. Therefore, even when the valve nut 61 is fastened to the valve stem 60, the casing 70 does not rotate with the valve nut 61. Accordingly, the casing 70 is easily mounted to the wheel 21.

The invention may be embodied in the following forms.

Figure 7A:
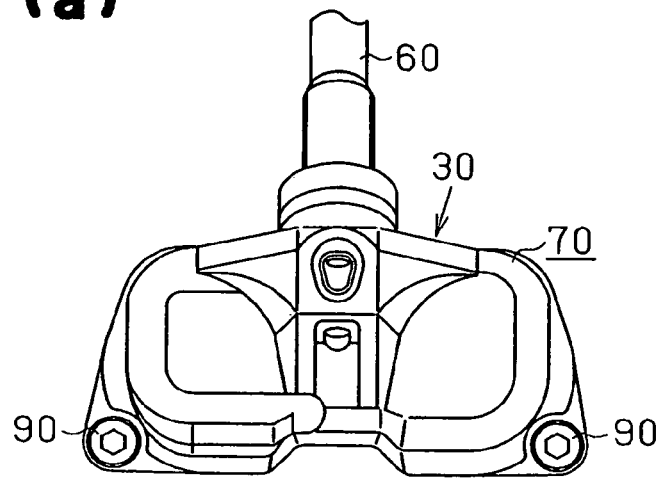
FIG. 7(a) is a plan view illustrating a casing according to a modified embodiment of the present invention.
Figure 7B:
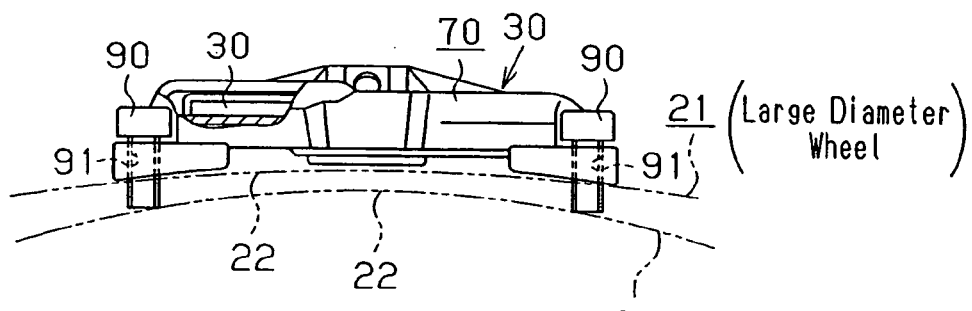
FIG. 7(b) is a front view illustrating the casing shown in FIG. 7(a)
Figure 7C:
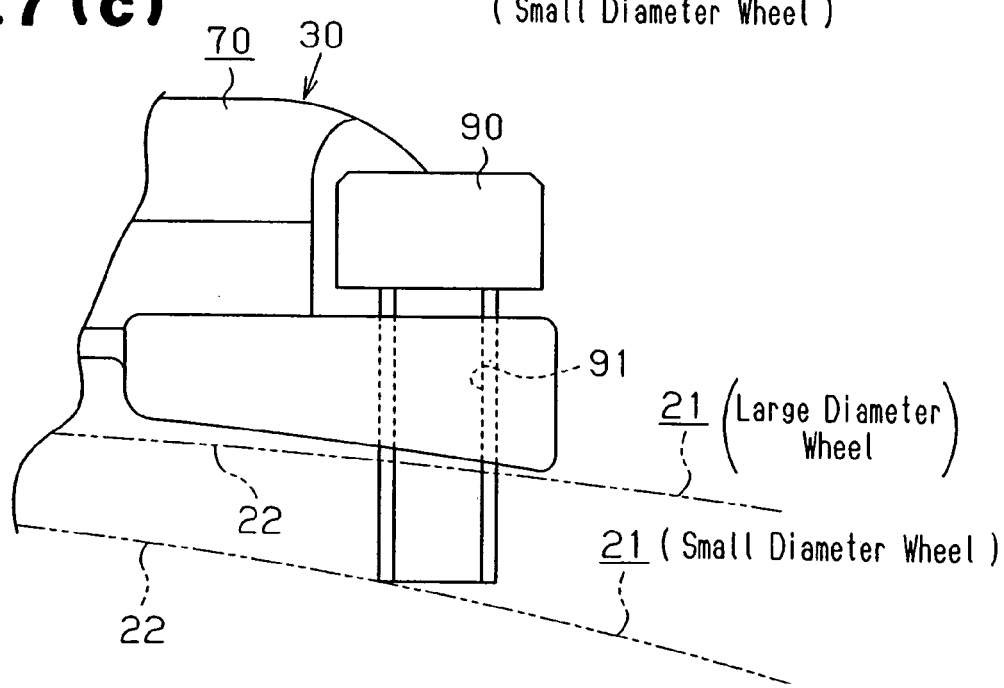
FIG. 7(c) is an enlarged view illustrating the right edge of the casing shown in FIG. 7(b).

As shown in FIGS. 7(*a*) to 7(*c*), a threaded hole (nut hole) 91 may be formed at each end of the casing 70 for mounting a height adjustment bolt 90. In this case, each height adjustment bolt 90 is threaded to one of the threaded holes 91. The bolts 90 functions function as legs. In this case, the legs each have a male thread portion. The legs are threaded into the casing 70. In other words, the legs are attached to the casing 70 such that the positions of the legs relative to the casing 70 are adjustable. With this structure, even if the size of the wheel 21 varies, the transmitter 30 can be mounted to the wheel 21 such that the height adjustment bolts 90 serving as the legs of the casing 70 abut against the wheel rim 22 by only selectively attaching and detaching or adjusting the height adjustment bolts 90. Furthermore, the length of the height adjustment bolts 90 may be continuously adjusted. Thus, even in a case where the size of the wheels 21 are the same but have different cross-sections, such as a deep rim, a shallow rim, a wide flat rim, and a wide deep rim, the casing 70 can be flexibly attached to the associated wheel 21. Thus, each transmitter 30 can be mounted to the associated wheel 21 such that the height adjustment bolts 90 serving as the legs of the casing 70, which accommodates the circuit portion 36, abut against the wheel rim 22 regardless of the size and the cross-section of the wheel 21.

A temperature sensor, which functions as a measuring device, may be provided on the transmitter 30 to wirelessly transmit air pressure data and internal temperature data of the tire 20 from the transmitter 30 as data representing the tire condition.

Other than four-wheeled vehicles, the present invention may be applied to two-wheeled vehicles, such as bicycles and motor cycles, multi-wheeled busses, multi-wheeled trailers and industrial vehicles, such as forklifts. When the present invention is applied to a trailer, the receiver 40 and the display 50 are provided in the tractor.

The present examples and embodiments are to be considered as illustrative and not restrictive and the invention is not to be limited to the details given herein, but may be modified within the scope and equivalence of the appended claims.

The invention claimed is:

1. A transmitter in an apparatus for monitoring a condition of a tire attached to a wheel of a vehicle, wherein the transmitter is fixed to the wheel such that the transmitter faces an outer circumferential surface of a wheel rim, the transmitter comprising:
   a circuit portion that detects the condition of the tire and generates a transmission signal that contains data representing the detected condition of the tire;
   a casing that accommodates the circuit portion; and
   a leg that extends from the casing toward the outer circumferential surface of the wheel rim, wherein the extended amount of the leg is adjustable such that the leg contacts the outer circumferential surface of the wheel rim when the transmitter is fixed to the wheel,
   wherein the leg includes an attachment that is detachably attached to the casing, and wherein the attachment is selected from a plurality of attachments that are prepared in advance according to variations in the size and the shape of the wheel,
   wherein an engagement mechanism for engaging the attachment with the casing is located between the casing and the attachment.

2. The transmitter according to claim 1, wherein the engaging mechanism includes an engaging opening formed in one of the casing and the attachment, and an engaging hook fanned in the other one of the casing and the attachment, and wherein the engaging hook can be engaged with the engaging opening.

3. The transmitter according to claim 1, wherein the engaging mechanism permits the attachment to be engaged with an detached from the casing by means of elastic deformation of the attachment.

4. The transmitter according to claim 1, wherein the leg is one of a pair of legs, and wherein the legs contact the outer circumferential surface of the wheel rim at least at sections that face the ends of the casing with respect to the circumferential direction of the wheel.

5. A transmitter in an apparatus for monitoring a condition of a tire attached to a wheel of a vehicle, wherein the transmitter is fixed to the wheel such that the transmitter faces an outer circumferential surface of a wheel rim, the transmitter comprising:
   a circuit portion that detects the condition of the tire and generates a transmission signal that contains data representing the detected condition of the tire;
   a casing that accommodates the circuit portion; and
   an attachment that is detachably attached to the casing, wherein the attachment has a pair of legs that extend from the casing toward the outer circumferential surface of the wheel rim, wherein the extended amount of the legs is adjustable such that the legs contact the outer circumferential surface of the wheel rim when the transmitter is fixed to the wheel, and wherein the legs contact the outer circumferential surface of the wheel rim at least at sections that face the ends of the casing with respect to the circumferential direction of the wheel;
   wherein the attachment is selected from a plurality of attachments that are prepared in advance according to variations in the size and the shape of the wheel;
   wherein an engagement mechanism for engaging the attachment with the casing is located between the casing and the attachment;
   wherein the engaging mechanism includes an engaging opening formed in one of the casing and the attachment, and an engaging hook formed in the other one of the casing and the attachment, and wherein the engaging hook can be engaged with the engaging opening; and
   wherein each engaging mechanism permits the attachment to be engaged with and detached from the casing by means of elastic deformation of the attachment.

\* \* \* \* \*